United States Patent
Burgdorf et al.

Patent Number: 5,374,114
Date of Patent: Dec. 20, 1994

[54] ELECTROHYDRAULIC PRESSURE CONTROL DEVICE

[75] Inventors: Jochen Burgdorf, Offenbach-Rumpenheim; Peter Volz, Darmstadt; Heinz Loreck, Idstein, all of Germany

[73] Assignee: Alfred Teves GmbH, Germany

[21] Appl. No.: 235,120

[22] Filed: Apr. 28, 1994

Related U.S. Application Data

[63] Continuation of Ser. No. 927,279, Sep. 15, 1992, abandoned.

[30] Foreign Application Priority Data

Jan. 15, 1991 [DE] Germany .............................. 4100967
Oct. 11, 1991 [DE] Germany .............................. 4133641

[51] Int. Cl.$^5$ ........................ B60T 13/66; F15B 13/08
[52] U.S. Cl. ............................ 303/119.2; 303/113.1
[58] Field of Search .............. 303/119.2, 113.1, 113.2; 137/596.17; 439/76, 672; 336/192; 335/202

[56] References Cited

U.S. PATENT DOCUMENTS

| | | | |
|---|---|---|---|
| 3,929,315 | 12/1975 | Rieth | 251/129 |
| 4,579,146 | 4/1986 | Tsuru et al. | 303/119.2 X |
| 4,785,848 | 11/1988 | Leiber | 137/596.17 |
| 4,842,525 | 6/1989 | Galloway et al. | 303/119.2 X |
| 4,898,360 | 2/1990 | VonHayn et al. | 137/884 |
| 4,929,038 | 5/1990 | Reinartz et al. | 303/119.2 |
| 5,040,853 | 8/1991 | Burgdorf et al. | 303/119.2 |
| 5,127,440 | 7/1992 | Maas et al. | 137/884 |

FOREIGN PATENT DOCUMENTS

| | | |
|---|---|---|
| 3813141 | 11/1983 | Germany . |
| 3236535 | 4/1984 | Germany . |
| 3413735 | 10/1985 | Germany . |
| 3439378 | 4/1986 | Germany . |
| 3514442 | 10/1986 | Germany . |
| 3634349 | 5/1987 | Germany . |
| 3710351 | 10/1988 | Germany . |
| 3725385 | 2/1989 | Germany . |
| 3729216 | 3/1989 | Germany . |
| 8813836 | 3/1989 | Germany . |
| 3742320 | 6/1989 | Germany . |
| 3821044 | 6/1989 | Germany . |
| 3742830 | 7/1989 | Germany . |
| 3813138 | 11/1989 | Germany . |
| 3813140 | 11/1989 | Germany . |
| 3816750 | 11/1989 | Germany . |
| 3842348 | 12/1989 | Germany . |
| 3836405 | 5/1990 | Germany . |
| 3939177 | 6/1990 | Germany . |
| 3919760 | 12/1990 | Germany . |
| 4003606 | 12/1990 | Germany . |
| 3924510 | 1/1991 | Germany . |
| 4001017 | 7/1991 | Germany . |
| 89/10286 | 11/1989 | WIPO . |

OTHER PUBLICATIONS

Haaf Edgar: Lageregelung an elektrohydraulischen Stellgliedern. In Fluid, Jun. 1977, S. 42, 45–47.

Primary Examiner—Andres Kashnikow
Assistant Examiner—Peter M. Poon
Attorney, Agent, or Firm—J. Gordon Lewis; Robert P. Seitter

[57] ABSTRACT

An electrohydraulic pressure control device consisting of one or several electromagnetically operable hydraulic valves arranged in a block-shaped manner on a valve accommodating body. In order to provide both a compact and operationally optimized pressure control device which makes manufacture, checking and assembly as easy as possible and where different thermal expansions of the components are to be received possibly without any tensions, this invention provides that the coils (1), flexibly held frictionally and/or positively by an elastic or plastic holding device (4) arranged on the carrier element (2) of the cover (3), are flexibly alignable with respect to the valve accommodating body (5).

28 Claims, 4 Drawing Sheets

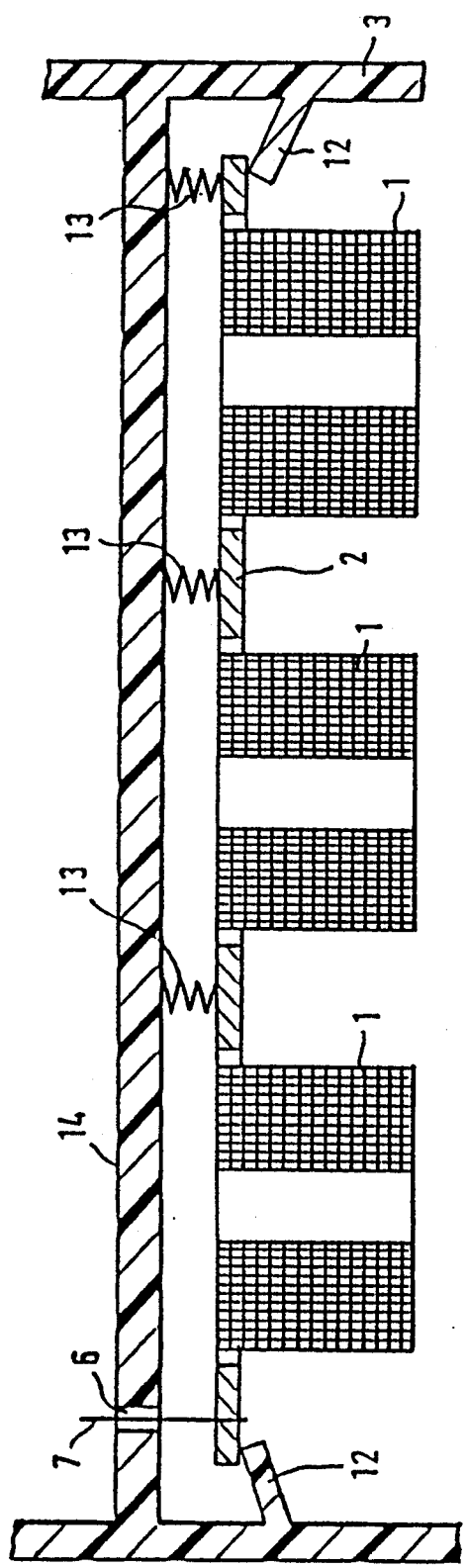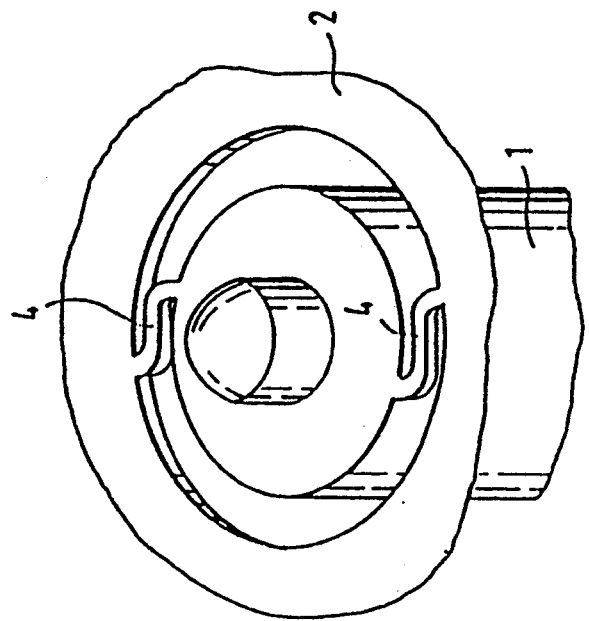

ELECTROHYDRAULIC PRESSURE CONTROL DEVICE

This application is a continuation of application Ser. No. 07/927,279 filed Sep. 15, 1992 now abandoned.

FIELD OF THE INVENTION

This invention relates to an electrohydraulic pressure control device, in particular to a braking pressure control device for use in an automotive braking control system, such as an anti-lock control device or a traction slip control device.

BACKGROUND OF THE INVENTION

Electrohydraulic pressure control devices where the cover or at least part of the cover is designed as an electronic control unit are known. In this respect, by way of example, reference is made to the embodiments of the international publication WO 89/10286 in accordance with which, beyond the well-known block construction of the valve accommodating body, the cover is subdivided by means of a plate-shaped carrier element in order to accommodate the electronic control unit. The cover of this reference also establishes the electric connection between the electronic control unit and the contact elements projecting from the solenoid valves. The coils of the solenoid valves and the cover are placed after one another onto the valve domes of the valve accommodating body, with plug contacts interlocking in order to establish the electric connection between the contact elements and the electronic control unit integrated in the cover.

The pressure control device of the above reference cannot be considered particularly advantageous in terms of manufacture, operation tests and assembly for the following reasons: (1) manufacture to extremely close tolerances is required for mounting and connecting the coils to the electronic part of the cover; (2) the operation tests of the electronic part, with the hydraulic part disconnected, are rendered more difficult because of the absence of coils; and (3) the stiffness of the components to be aligned with one another complicates assembly because of the dependence on the manufacturing precision requirements mentioned above. Moreover, different operating temperatures and, thus, thermal expansions between the individual components can produce undesired mechanical tensions.

It is also known to form an assembly unit by combining such a valve block, to be used for a controlled brake system, with the associated electronic circuitry or rather with the electronic control unit. To this end, the actual valve block, which is mainly composed of the valve accommodating body, the valves and the valve coils, is detachably connected with the electronic control unit by means of a contact-pin- and-sleeve connection, as disclosed in German Published Patent Application No. 01 017 A1.

It is an object of this invention to improve pressure control devices in order to provide both a compact and operationally optimized pressure control device which makes manufacture, testing and assembly as easy as possible and which minimizes the tension between components with different thermal expansions and to disclose a method for manufacturing such a pressure control device.

SUMMARY OF THE INVENTION

The electrohydraulic pressure control device of the present invention includes an electromagnetically operable hydraulic valve mounted to a valve block for controlling fluid flow within an automotive braking control system. A coil, through which the electromagnetically operable hydraulic valve extends, generates a magnetic field which actuates the valve, and is electrically connected with an electronic control unit by means of a contact element. A cover is mounted to the valve block and covers the coil and at least a portion of the contact element. A flexible coupler extends between the cover and the coil to flexibly couple the coil to the cover, which permits flexible alignment of the coil with the electromagnetically operable hydraulic valve. In other embodiments of the invention, two or more electromagnetically operable hydraulic valves may be mounted to a valve block, with each valve requiring its own coil, and with each coil requiring its own contact element.

In another embodiment of the invention, the cover includes a carrier element in the form of a partition wall, which subdivides the cover into a first area and a second area. The electronic unit may be disposed within the first area of the cover and the flexible coupler may include an elastic holding device disposed in the second area and coupled to the carrier element of the cover.

In a preferred embodiment of this invention, the carrier element is provided with openings penetrated by the protruding contact elements of the coils. In doing so, it is advantageous to design the inside width of the openings larger than the outside dimension of the contact elements. Thus, one of the preconditions has been complied with which enables an easy alignment and fastening of the components with regard to one another as well as an unhindered thermal expansion of the parts.

In order to suppress electromagnetic noise fields during the valve switching phases, a shield—preferably shaped like a plate—is arranged in the area of the carrier element and of the electronic control unit. The shield can be arranged on the upper side and/or on the underside or within the carrier element.

A further embodiment with respect to fastening the coils on the carrier element includes forming the elastic holding device in the design of a stuffing box inserted between the opening of the carrier element and the contact elements in a frictionally engaged and/or positive manner.

Further alternative embodiments with respect to elastic fastening and electric contacting of the coils on the carrier element involve providing a plurality of elastic holding devices. As homogeneous components of the carrier element, these holding devices are axially and radially shiftable and preferably act on the surface areas of the coils and can further be used for accommodating the current conductors. In accordance with another embodiment of the invention, the elastic holding devices are designed as spring elements embracing the coils and mountable separately to the carrier element. This enables any fitting tolerances to be compensated that may exist between the valve accommodating body and the coils elastically suspended in the cover.

In accordance with a further embodiment of the inventive subject matter, an elastic molded structure or an elastic compound positions and holds the valve coils in the cover in a way that corresponds to the valve arrangement.

Positioning and holding the valve coils in the cover or in the housing renders a manufacturing method possible in the process of which, at first, the coils are wired to the electronic elements to form a completed component and where, subsequently, this completed component is placed onto the valve accommodating body or on the valve housings, respectively. For purposes such as checking or repair, it is likewise possible to remove this complete unit, made up of the coils and the electronic elements, from the valve block with relative ease because it is not necessary to disconnect any electric attachments. In a way of speaking, the connection between the valve block and the valve coils is a "magnetic plug".

The elasticity of the molded structure positioning and holding the valve coils ensures a compensation of tolerances during assembly so that no excessive mechanical tensions can form between the valve housings and valve coils. Flexible connection lines uniting the coils with the electronic elements also make it possible that the magnetic plug can be assembled and disconnected several times without damaging the connections.

After mounting together the cover and the valve accommodating body, the individual valve coils surround the appertaining valve domes and abut against a front face on the base surface of the valve accommodating body.

In accordance with an advantageous embodiment of this invention the elastic molded structure or the elastic compound is designed such that, upon placing of the cover on the valve block, a sealing will form between the cover edge and the valve accommodating body as will a contact force ensuring a firm seat of the coil on the valve accommodating body. This will prevent the formation of an air gap on the valve seat, i.e., between the seated front face of the coil and the valve accommodating body.

According to an advantageous embodiment of this invention, it is possible to prefabricate the molded structure and to design it such as to enable it to be inserted into the housing before inserting the valve coils. It is expedient to arrange hollow spaces in the molded structure in order to enhance the elasticity and also, if applicable, a small plasticity of the molded structure or in order to save weight and material.

A method for manufacturing the inventive pressure control device consists in that, by means of an auxiliary device, the valve coils are initially positioned and fastened in the cover or in the housing, respectively, and are provided with electric attachments 16 leading outwards and in that, thereupon, an elastic compound is poured in to form the elastic molded structure. In this operation it is also possible to produce the above-mentioned hollow spaces in the molded structure by means of a corresponding mold.

Further characteristics, advantages and applications will become evident from the following description of several examples of embodiments of this invention, with reference to the accompanying drawings.

BRIEF DESCRIPTION OF THE DRAWINGS

FIG. 2 is a longitudinal section through the cover of a pressure control device according to a second embodiment of the present invention;

FIG. 3 is the perspective view of a holding device of a coil according to a third embodiment of the present invention;

DETAILED DESCRIPTION OF THE INVENTION

Figure 1:
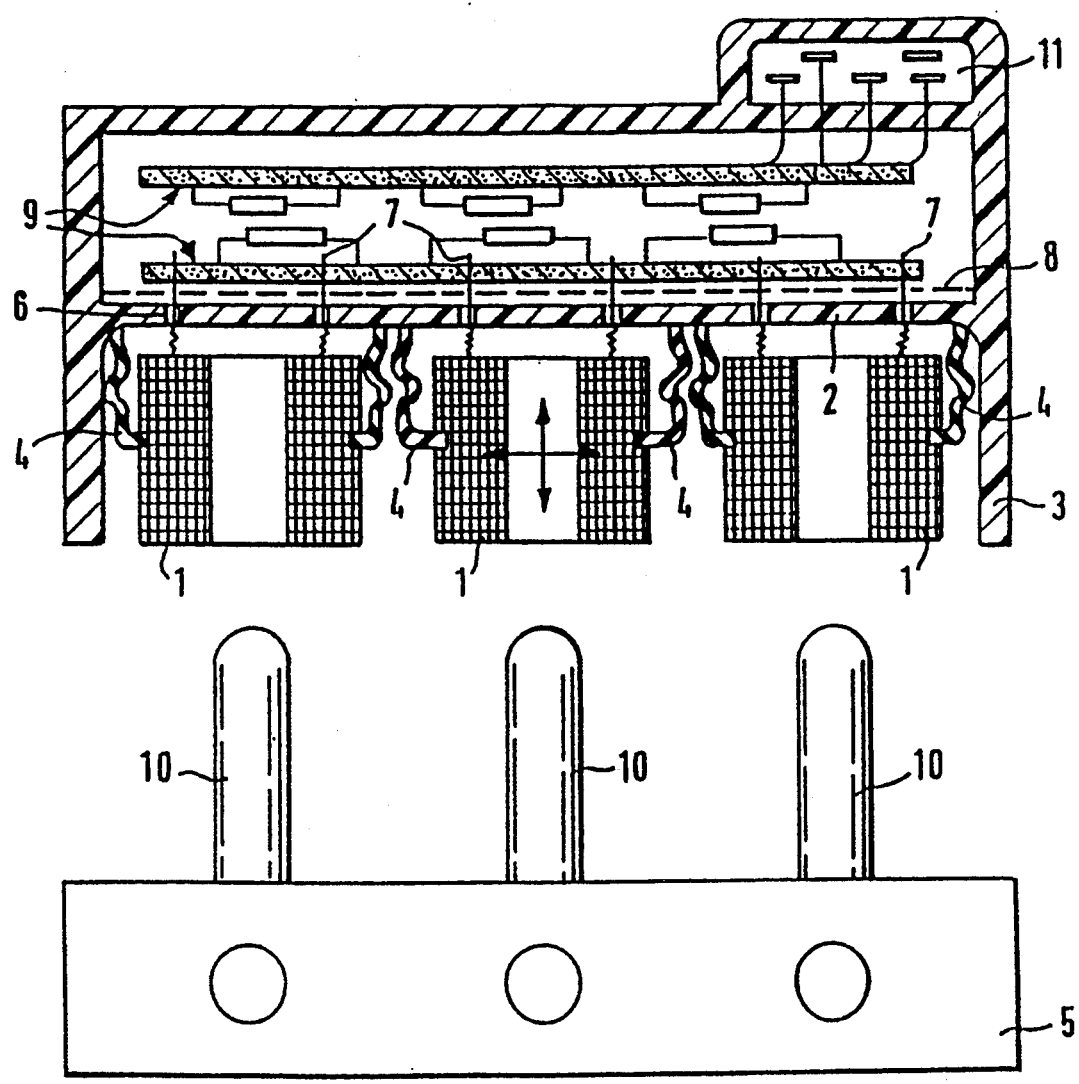
FIG. 1, is a partially exploded, partial section side view through a pressure control device according to a first embodiment of the present invention.

FIG. 1 shows a side view of the inventive pressure control device and shows the basic components. The represented pressure control device consists of a cover 3 shown in profile cross-section and of a steel or light-metal block-shaped valve accommodating body 5, i.e. a valve block. In the longitudinal direction, the cover accommodates a horizontal partition wall, referred to as carrier element 2, which reinforcingly subdivides the cover 3 into two areas.

An electronic control unit 9 is disposed in the closed upper area of the cover 3 (as per FIG. 1). The electronic control unit 9 has main components which are shown by the schematic representation of a printed circuit board or a printed ceramic circuit plate or a printed circuit foil provided with resistors and transistors. A shield 8, effective against electromagnetic noise fields, is arranged between the electronic control unit 9 and the carrier element 2. The construction of this shield 8 is adapted to the radiated frequency range of the coils 1. This is why the shield 8 is sketched out as a component not defined in precise detail. The shield 8 can be manufactured by metallic coating, printing, from filled polymeric materials or from metallic plates.

The carrier element 2 is provided with openings 6. Their arrangement corresponds to the spatial distribution of the coils 1 on the valve accommodating body 5. All the coils 1 which, in the drawing are arranged in the lower area of the cover 3, project with the contact elements 7 through the openings 6 of the carrier element 2. Contact elements 7 are assigned in pairs to each coil 1. If relatively stiff contact elements 7 are used, the openings 6 are generously dimensioned so as to grant the contact elements 7 an unhindered lateral freedom of motion. However, if contact elements 7 are elastic, it will not be necessary to use the relatively large openings.

When openings 6 are relatively large, the play is used for the arrangement of elastic holding devices 4 having the design of stuffing boxes, for instance, and movably anchoring the coils 1 in the carrier element 2. The ends of the contact elements 7 penetrate the shield 8 and are preferably soldered to the printed circuit board or to the ceramic circuit plate or to the circuit foil arranged on top thereof and accommodating the electronic control unit 9. A particularly compact, efficient electronic unit will be achieved if circuit foils are used whose space requirements are particularly low as they, because of their flexibility, are foldable by means of film hinges so as to lie on top of one another.

From the drawing, specific elastic holding devices 4 are discernible that, joined to the injection-molded plastic cover, produce a homogeneous resilient unit, with the holding devices 4 acting with their resilient legs on the surface areas of the coils 1. The elastic embracing of the coils 1 on the cover 3 ensures the precondition of an unhindered alignment of the coils 1, both radially and axially, in respect of the valve domes 10 of the valve accommodating body 5. It is further possible to have the coils 1 exert a defined axial contact pressure on the valve accommodating body 5 by means of resilient forces active in the holding devices 4.

Simultaneously, the contact elements 7 will stay tension-free because of the previously described suspension of the coils 1 in the cover 3 so that it will not be necessary to use relatively stiff contact elements 7. Thus, the stuffing-box-type holding devices and the relatively large-dimensioned openings 6 for that purpose in the carrier element 2 will likewise become superfluous as will the elastic sealing of the carrier element 2 by means of a sealing compound. Because of the separation of the components, in terms of hydraulic and electronic functional units, there will be independent operation tests and, if the case arises, an exchange of a unit for easy and cost-saving repair. The electric plug connections 11 of the pressure control device are arranged in the cover 3, preferably as a multipoint plug as is already known in the art, in order to establish the power supply between the energy source and the electronic control unit 9.

As an alternative to FIG. 1, FIG. 2 shows a longitudinal section through part of the cover 3 whose side walls are provided with lugs 12. A movably guided carrier element 2 catches under the action of spring elements 13 and is held there so as to be movable within its position up to a limited extent. The spring elements 13 support themselves on a parallel partition wall 14 of cover 3 opposite the carrier element 2.

The partition wall 14 has an opening 6 for the electric connection of the coils 1 with the electronic control unit, and the electric connection is guided in the carrier element 2. The opening 6 will be generously dimensioned in order to permit a limited free movability of the carrier element 2 with respect to the cover 3 if rigid contact elements 7 are used. Or, alternatively, elastic contact elements 7 will establish the connection between the coils 1 held in the carrier element 2 and the electronic control unit. Needing only one opening 6 in the partition wall 14 separating the valve block from the electronic control unit, the represented embodiment therefore ensures a particularly good sealing action without the necessity of limiting the free movability of the coils 1.

A further advantageous embodiment with regard to the subject matter of this invention becomes evident from FIG. 3. FIG. 3 shows a three-dimensional view of a detail, based on a variant of the embodiment shown in FIG. 2, in accordance with which, by way of exemplary representation, a coil 1 is connected with the plate-shaped carrier element 2 by means of elastic holding devices 4. The carrier element 2 is simultaneously suited to receive the current conductors leading from the electronic control unit to the coil 1. Thus, it is ensured that only one common electric bus line will have to be passed through the partition wall of the cover 3 to the electronic control unit so that a relatively easy adaptation to different functional interests is warranted while maintaining the basic design of the pressure control device for the most part. Thus, both the required coil sets and the electronic control unit can be adapted optimally as subunits to the respective valve block. Further, the above described material connection between the carrier element and the elements of the electronic control unit enables the same to be adapted advantageously to the manufacturing technology in current use. Moreover, by means of an elastic or, if applicable, even by means of a plastic connection of the coils to the carrier element, it is possible to minimize the mechanical stress which is caused by thermomechanical tensions, among other factors.

Figure 4:
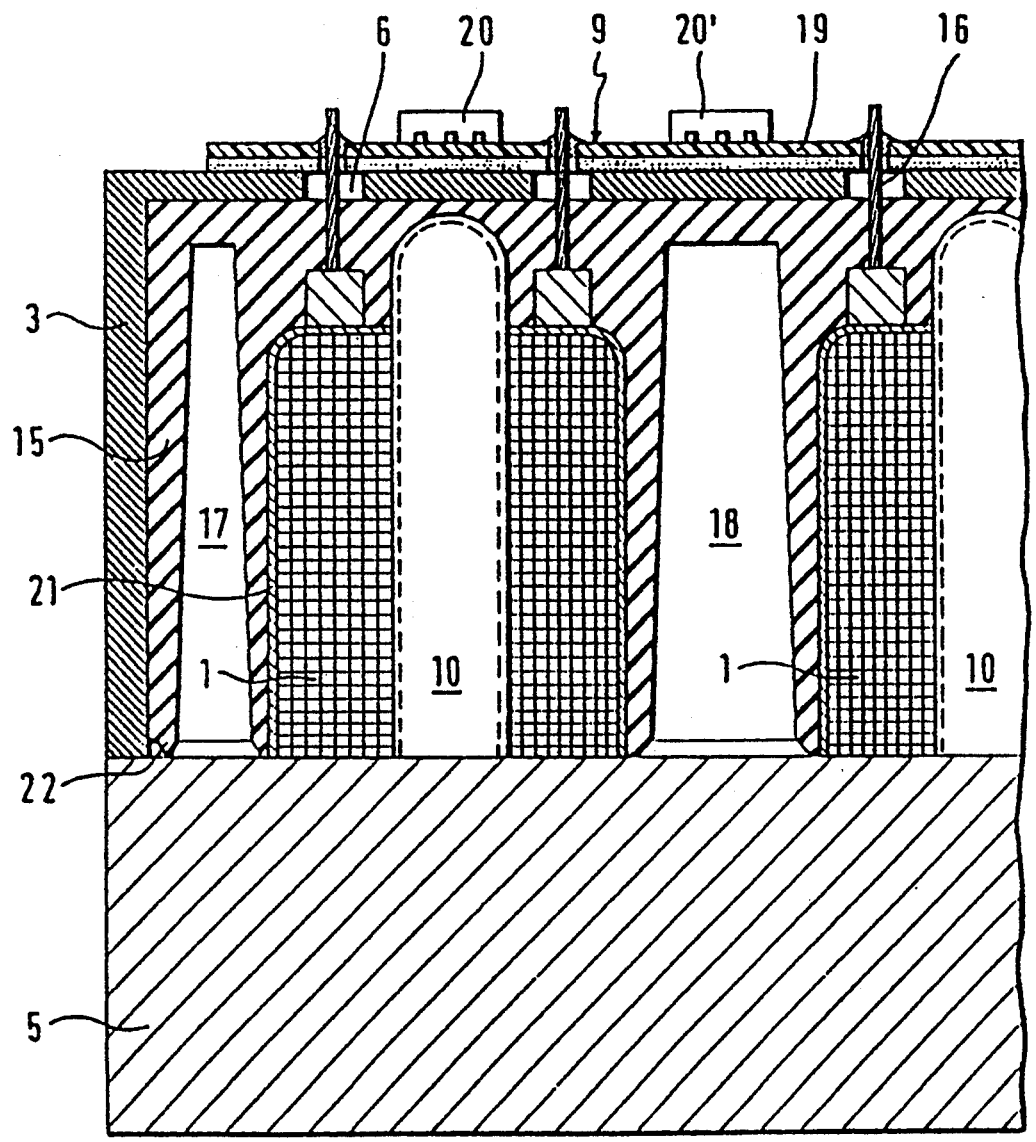
FIG. 4 is the section of a pressure control device according to a fourth embodiment of the present invention.

The pressure control device according to FIG. 4 essentially consists of a valve block or valve accommodating body 5 and of a cover 3 or housing. Individual valve domes 10 project from this valve accommodating body 5, in a known manner. Accommodated within the individual valve domes 10 are valve parts (not shown) which are movable by magnetic force. Such a valve block for an anti-lock control system with individual control per wheel generally contains eight such valves, namely four inlet valves and four outlet valves. As is generally known, the valve actuating force is generated by a magnetic field acting from a coil 1 through the valve dome 10 on non-illustrated valve bodies arranged inside the valve dome 10. The valve block 5 and the valve domes 10 advantageously are made from steel.

Inside the cover 3, coils 1 are arranged and held by means of an elastically deformable molded structure 15 such that, when the cover 3 is placed onto the valve block 5, the coils 1 will come to abut on the appertaining valve domes 10 and on the base surface of the valve accommodating body 5. The coils 1 are connected with a printed circuit board 19 by means of flexible leads passed through openings 6 in the wall of the cover 3. The printed circuit board 19 leads to the electronic elements or carries the electronic unit, which is indicated by reference numeral 9. Symbolically, some electronic components 20, 20' are shown in outline in the drawing. As is generally known and, therefore, not illustrated in this drawing, the electronic elements are protected by a cover of their own or are embedded in an insulating compound.

The individual coils 1 consist of a (non-illustrated) winding and of a steel jacket 21 influencing the magnetic field pattern. Regarding this magnetic field pattern, it is of importance that, at the maximum, there will form a minimal air gap between the front faces of the coils 1 and the contact surface, namely the base surface of the valve block.

The elastic molded structure 15 is designed and dimensioned such that a sealing lip 22 will form at the joint of the cover 3 with the valve block 5. This sealing lip 22 performs a sealing action after the two parts have been mounted together. Under the action of the force of the elastic molded structure 15, the coils 1 expediently will at first project somewhat over the top of the end surface of the cover 3 whereby automatically a pressure will form after the cover 3 has been placed onto the valve block and has been fastened. This pressure will act on the valve seat between the front faces of the coils 1 and the contact surface on the valve block.

As will easily be understood, by means of hollow spaces 17, 18 in the molded structure, it is possible to influence the elasticity of the structure in the desired manner and, moreover, it is thus possible to economize on the weight or material.

As already mentioned, the elastic molded structure 15 may be prefabricated and inserted into the cover 3 before inserting the valve coils 1. On the other hand, it is also possible to initially position the coils in the cover 3 by means of corresponding auxiliary equipment and to form the molded structure 15 subsequently by pouring a suitable compound into the cover 3.

Figure 5:
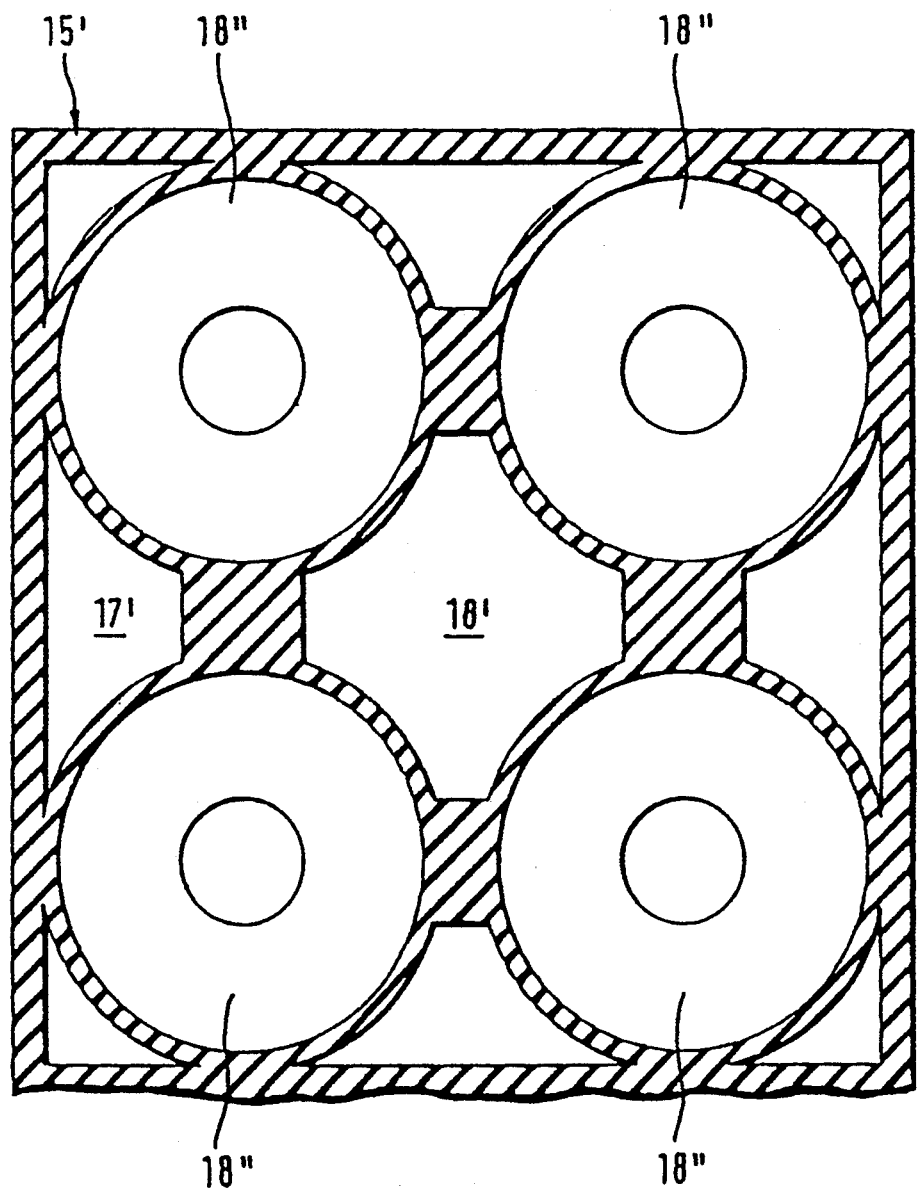
FIG. 5 is a section, perpendicular to FIG. 4, through a prefabricated molded structure for a pressure control device according to a fourth embodiment of the present invention.

FIG. 5 shows an example of an embodiment of a prefabricated elastic molded structure 15' in accordance with this invention. This example shows a more packed arrangement of the valves and valve coils on the valve accommodating body as compared with the design shown in FIG. 4.

The hollow spaces 18'' serve to accommodate valve coils (not shown in FIG. 5) similar to the coils 1 of FIG. 4. The hollow spaces 17' and 18' are comparable to the hollow spaces 17 and 18 of FIG. 4, respectively. The elasticity or a defined plasticity of the material will compensate tolerances with regard to the arrangement of the individual valve domes (10 in FIG. 4.) on the valve accommodating body. Such a molded structure can be manufactured at low costs which goes without any further explanation.

What is illustrated is a molded structure for a valve block with four valve domes or valves. Using the same principle, it is, however, also possible to realize molded structures and "magnetic plugs" for valve blocks with six, eight or an even higher number of valves.

What is claimed:

1. An electrohydraulic pressure control device consisting of one or several electromagnetically operable hydraulic valves arranged in a block-shaped manner on a valve accommodating body and having coils projecting over the top of the valve accommodating body, with said coils being provided with contact elements on their parts which project over the top of the valve accommodating body, of a cover covering the projecting coil parts and the contact elements and of a carrier element for electric contacts which is arranged within the cover, with the cover or part of the cover being designed as an electronic control unit or as part of an electronic control unit, characterized in that the coils, fastened frictionally or positively by means of an elastic holding device arranged on the carrier element of the cover, are alignable with respect to the valve accommodating body.

2. An electrohydraulic pressure control device as claimed in claim 1, characterized in that the carrier element is provided with openings penetrated by the protruding contact elements of the coils.

3. An electrohydraulic pressure control device as claimed in claim 2, wherein the carrier element has a side averted from the coils and the coils generate electromagnetic noise fields characterized in that, on the side of the carrier element which is averted from the coils, the electronic control unit designed as part of the cover has a shield counteracting the electromagnetic noise fields.

4. An electrohydraulic pressure control device as claimed in claim 3, characterized in that the shield is designed as a shield plate arranged in a parallel intermediate position in the area of the carrier element and of the electronic control unit.

5. An electrohydraulic pressure control device as claimed in claim 4, characterized in that the holding device has the design of a stuffing box which, inserted into the openings of the carrier element, embraces the contact elements of the coils in a frictionally engaged manner.

6. An electrohydraulic pressure control device as claimed in claim 3, characterized in that the holding device, as a homogeneous component of the carrier element, acts on the coils in an axially and radially displaceable manner.

7. An electrohydraulic pressure control device as claimed in claim 6, further comprising an electric current conductor leading to the coils and accommodated within the holding device.

8. An electrohydraulic pressure control device as claimed in claim 1, characterized in that the holding device consists of individual spring elements acting at least in pairs on the coils and preferably held on the carrier element so as to be exchangeable.

9. An electrohydraulic pressure control device for use in an automotive braking control system, said device comprising:
a valve block;
an electronic control unit;
an electromagnetically operable hydraulic valve, mounted to said valve block, for controlling fluid flow within the automotive braking control system;
a coil, through which said electromagnetically operable hydraulic valve extends, for generating a magnetic field to actuate said electromagnetically operable hydraulic valve;
a contact element extending between said coil and said electronic control unit and electrically connecting said coil and said electronic control unit;
a cover mounted to said valve block and covering said coil and at least a portion of said contact element; and
flexible coupling means, extending between said coil and said cover, for flexibly coupling said coil to said cover and for permitting flexible alignment of said coil with said electromagnetically operable hydraulic valve.

10. An electrohydraulic pressure control device in accordance with claim 9, wherein:
said cover includes a partition wall subdividing said cover into a first area and a second area;
said electronic control unit is disposed within said first area of said cover; and
said flexible coupling means include an elastic holding device coupled to said partition wall of said cover.

11. An electrohydraulic pressure control device in accordance with claim 10, wherein said partition wall includes an opening through which said contact element extends.

12. An electrohydraulic pressure control device in accordance with claim 11 wherein said elastic holding device is a stuffing box inserted into said opening for engaging said contact element.

13. An electrohydraulic pressure control device in accordance with claim 10 further comprising a shield, disposed between said electronic control unit and said coil, for counteracting electromagnetic noise fields from said coil.

14. An electrohydraulic pressure control device in accordance with claim 13 wherein said shield is a plate arranged in parallel in said first area between said electronic control unit and said partition wall.

15. An electrohydraulic pressure control device in accordance with claim 10, wherein said elastic holding device is a homogeneous component of said partition wall and permits axial and radial movement of said coil relative to said electromagnetically operable hydraulic valve.

16. An electrohydraulic pressure control device in accordance with claim 10 wherein said contact element extends through said elastic holding device.

17. An electrohydraulic pressure control device in accordance with claim 10 further comprising a carrier element to which said coil is mounted and wherein said elastic holding device includes spring elements and said cover has inwardly protruding lugs engaging said carrier element for limiting relative axial movement between said cover and said coil.

18. An electrohydraulic pressure control device in accordance with claim 9, further comprising a valve dome within which said electromagnetically operable hydraulic valve is disposed and wherein said flexible coupling means include an elastic molded structure.

19. An electrohydraulic pressure control device in accordance with claim 18, wherein said coil surrounds said valve dome and abuts against a base surface of said valve block.

20. An electrohydraulic pressure control device in accordance with claim 18, wherein said valve block and said cover form a joint, and said elastic molded structure includes a lip, formed at the joint of said valve block and said cover, for sealing said joint and said elastic molded structure urges said coil to abut against a base surface of said valve block.

21. An electrohydraulic pressure control device in accordance with claim 18, wherein said elastic molded structure is prefabricated and inserted into said cover before said coil is inserted into said cover.

22. An electrohydraulic pressure control device in accordance with claim 9, wherein:
said cover includes a partition wall subdividing said cover into a first area and a second area;
said electronic control unit is disposed within said first area of said cover;
said coil is disposed within said second area of said cover, and
said flexible coupling means are disposed within said second area of said cover and include an elastic holding device coupled to said partition wall of said cover.

23. A method for manufacturing an electrohydraulic pressure control device comprising the steps of:
positioning a plurality of coils, which are provided with electric attachments, in a cover;
pouring a compound in said cover to form an elastic molded structure for flexibly aligning said coils; and
mounting a valve block, having a plurality of electromagnetically operable hydraulic valves, to said cover to achieve an alignment between said coils and said electromagnetically operable hydraulic valves.

24. An electrohydraulic pressure control device for use in an automotive braking control system, said device comprising:
a valve block;
an electronic control unit;
a plurality of electromagnetically operable hydraulic valves, each mounted to said valve block, for controlling fluid flow within the automotive braking control system;
a plurality of coils, through each of which one of said electromagnetically operable hydraulic valves extends, for generating magnetic fields to actuate said electromagnetically operable hydraulic valves;
a plurality of contact elements extending between said coils and said electronic control unit and electrically connecting said coils and said electronic control unit;
a cover mounted to said valve block and covering said coils and at least a portion of said contact elements; and
flexible coupling means, extending between said coils and said cover, for flexibly coupling said coils to said cover and for permitting flexible alignment of said coils with said electromagnetically operable hydraulic valves.

25. An electrohydraulic pressure control device comprising:
a plurality of electromagnetically operable hydraulic valves arranged in a block-shaped manner on a valve accommodating body;
a plurality of coils projecting over the top of the valve accommodating body, with said coils being provided with contact elements on their parts which project over the top of the valve accommodating body;
a cover covering the projecting coil parts and the contact elements;
a carrier element for electric contacts which is arranged within the cover, with the cover or part of the cover being designed as an electronic control unit or as part of an electronic control unit;
an elastic holding device, arranged on the carrier element of the cover and consisting of individual spring elements acting at least in pairs on the coils, for frictionally or positively fastening the coils to the valve accommodating body and aligning the coils to the valve accommodating body.

26. An electrohydraulic pressure control device as claimed in claim 25 wherein the elastic holding device is held on the carrier element so as to be exchangeable.

27. An electrohydraulic pressure control device for use in an automotive braking control system, said device comprising:
a valve block;
an electronic control unit;
an electromagnetically operable hydraulic valve, mounted to said valve block, for controlling fluid flow within the automotive braking control system;
a valve dome within which said electromagnetically operable hydraulic valve is disposed;
a coil, through which said electromagnetically operable hydraulic valve extends, for generating a magnetic field to actuate said electromagnetically operable hydraulic valve;
a contact element extending between said coil and said electronic control unit and electrically connecting said coil and said electronic control unit;
a cover mounted to said valve block and covering said coil and at least a portion of said contact element; and
flexible coupling means, extending between said coil and said cover and including an elastic molded structure having hollow spaces of varying width for influencing the elasticity of said elastic molded structure, for flexibly coupling said coil to said cover and for permitting flexible alignment of said coil with said electromagnetically operable hydraulic valve.

28. An electrohydraulic pressure control device for use in an automotive braking control system, said device comprising:
a valve block;
an electronic control unit;

a plurality of electromagnetically operable hydraulic valves, each mounted to said valve block, for controlling fluid flow within the automotive braking control system;

a plurality of coils, through each of which one of said electromagnetically operable hydraulic valves extends, for generating magnetic fields to actuate said electromagnetically operable hydraulic valves;

a plurality of contact elements extending between said coils and said electronic control unit and electrically connecting said coils and said electronic control unit;

a cover mounted to said valve block, including a partition wall subdividing said cover, and covering said coils and at least a portion of said contact elements; and flexible coupling means, extending between said coils and said cover and including an elastic holding device, which:
 (a) is coupled to said partition wall,
 (b) is a homogeneous component of said partition wall, and
 (c) permits axial and radial movement of said coils relative to said electromagnetically operable hydraulic valves, for flexibly coupling said coils to said cover and for permitting flexible alignment of said coils with said electromagnetically operable hydraulic valves.

* * * * *